(12) United States Patent
Kim et al.

(10) Patent No.: US 8,458,891 B2
(45) Date of Patent: Jun. 11, 2013

(54) METHOD OF CENTERING A DISK OF HARD DISK DRIVE

(75) Inventors: Kyung Ho Kim, Seoul (KR); Ha Yong Kim, Seoul (KR); Kyu Nam Cho, Seoul (KR); Yong-Soo Kim, Seoul (KR)

(73) Assignee: Seagate Technology International, Grand Cayman (KY)

( * ) Notice: Subject to any disclaimer, the term of this patent is extended or adjusted under 35 U.S.C. 154(b) by 273 days.

(21) Appl. No.: 13/006,557

(22) Filed: Jan. 14, 2011

(65) Prior Publication Data

US 2011/0181983 A1    Jul. 28, 2011

(30) Foreign Application Priority Data

Jan. 26, 2010  (KR) .............................. 2010-0006760

(51) Int. Cl.
*G11B 5/127*    (2006.01)
*H04R 31/00*    (2006.01)

(52) U.S. Cl.
USPC ................. 29/603.03; 29/603.04; 29/603.07; 29/739; 228/175; 228/180.22; 228/219; 360/98.08; 360/99.06; 360/99.07; 360/99.12

(58) Field of Classification Search
USPC ..... 29/603.01, 603.03–603.07, 729; 228/175, 228/180.22, 219; 360/98.08, 99.06, 99.07, 360/99.12, 245.9, 240, 244, 244.2, 244.8
See application file for complete search history.

(56) References Cited

U.S. PATENT DOCUMENTS

| | | | |
|---|---|---|---|
| 5,243,479 A * | 9/1993 | Nakagoshi et al. | 360/98.01 |
| 6,606,221 B2 * | 8/2003 | Lalouette | 360/135 |
| 7,164,554 B2 * | 1/2007 | Sirilutporn et al. | 360/99.12 |
| 8,110,965 B2 * | 2/2012 | Iwai et al. | 310/370 |
| 2003/0192166 A1 * | 10/2003 | Kelemen | 29/603.03 |

* cited by examiner

*Primary Examiner* — Paul D Kim
(74) *Attorney, Agent, or Firm* — HolzerIPLaw, PC

(57) ABSTRACT

A method of centering a disk of a hard disk drive includes arranging a disk on an upper end portion of a hub on which a plurality of disks are rotatably assembled, and assembling the disk on the hub by vibrating the hub. Accordingly, the disks and/or spacers may be easily assembled on the hub, a time of centering may be relatively much reduced, and a superior centering quality may be obtained.

20 Claims, 21 Drawing Sheets

METHOD OF CENTERING A DISK OF HARD DISK DRIVE

CROSS-REFERENCE TO RELATED APPLICATIONS

This application claims priority under 35 U.S.C. §119(a) from Korean Patent Application No. 10-2010-0006760, filed on Jan. 26, 2010, in the Korean Intellectual Property Office, the disclosure of which is incorporated herein in its entirety by reference.

BACKGROUND

1. Field of the Invention

The present general inventive concept relates to a method of centering a disk of a hard disk drive (HDD), and more particularly, to a method of centering a disk of an HDD by which a disk or a spacer may be easily assembled on a hub, a time of centering may be relatively much reduced, and a superior centering quality may be obtained.

2. Description of the Related Art

Hard disk drives (HDDs) are memory devices formed of electronic apparatuses and mechanical apparatuses for recording and reproducing data by converting a digital electronic pulse into a permanent magnetic field. The HDD is widely used as an auxiliary memory device for a computer system because it can access a large amount of data at high speed.

The HDD may include a disk stack assembly having a disk for recording and storing data, a head stack assembly (HSA) for reading out data from the disk by pivoting across the disk around a predetermined pivot shaft, a printed circuit board assembly (PCBA) for controlling the above constituent elements by mounting most circuit parts on a printed circuit board (PCB), a base on which the above constituent elements are assembled, and a cover for covering the base.

Imbalance in a rotating system such as a head stack assembly or a disk stack assembly is an amount of imbalance generated by eccentrically distributed mass of a rotary body with respect to each rotation center. The imbalance generates vibrations and noise during rotation. Especially, in a disk stack assembly, the eccentricity of a disk damages a ball bearing or a fluid bearing of a spindle motor so that reliability of an HDD may be deteriorated. Also, the imbalance has an ill effect on a servo track write (STW) process in a manufacturing process of an HDD.

Although there are various reasons for generation of imbalance in the disk stack assembly, due to tolerance of constituent elements such as a spindle motor, a disk, or a spacer constituting the disk stack assembly, the rotation center of each of the constituent elements does not match a weight center to the rotation center of assembled constituent elements in the assembly of the constituent elements so that imbalance may be generated due to the eccentricity.

Many studies on technologies to improve the imbalance of a disk stack assembly have been performed and some of the technologies are introduced herein.

First, a spacer or a disk is pushed to one side and a displacement is measured. Then, the spacer or disk is pushed in the opposite direction by half of the measured displacement so that alignment may be achieved.

Second, when disks are assembled on a hub, the amount of imbalance between the disks and the hub is measured. By giving an impact to one side of a disk, a state in which the amount of balance is the minimum is obtained. This is referred to as a dynamic imbalance method.

Third, when a plurality of disks are assembled, one disk is pushed to one side whereas another one is pushed to the opposite side. Thus, the disks are assembled in a zigzag or biased form so that the amount of imbalance is reduced in terms of probability.

Fourth, the amount of imbalance is measured during assembly of a disk, and mass balance is added to a side having a relatively less.

The above methods are used because making tolerance between the hub and the spacer tight in order to continuously stack a plurality of disks is difficult. In detail, when the tolerance is made too tight, the centering process may not be needed by greatly reducing the amount of imbalance.

However, when the tolerance of the hub, the disk, and the spacer is made tight, it is difficult to push the spacer and the disk down to the lower portion of the hub, that is, the bottom side, to sequentially stack the spacer and the disk. If the spacer and the disk are forcibly pushed down, scratches or cuts may be highly likely to be generated on the hub.

The scratches and cuts may generate particles and then the particles may scratch the disk so that the quality of an HDD may be badly affected. Also, when the spacer and the disk are forcibly pushed down as described above, a degree of flatness of a surface of the spacer during stacking the spacer and the disks is affected so that the quality of STW, that is, repeatable run out (RRO) or non-repeatable run out (NRRO), may be badly affected.

In the above-described conventional method for centering a disk of an HDD, imbalance is reduced not by accurately performing the centering of a disk by allowing the hub, the disk, and the spacer to have tight tolerance, but by using a method of reducing the amount of imbalance by an additional process of measuring the amount of imbalance after assembly or by allowing imbalance that an HDD basically keeps, to a degree. As a result, the quality characteristic of each of the HDDs varies due to an assembly state and thus there is a certain limit in productivity and improvement of a recording characteristic. Until now, the limit has been overlooked due to the problem in the assembly of a disk as described above.

SUMMARY

The present general inventive concept provides a method of centering a disk of a hard disk drive (HDD) by which a disk and/or a spacer may be easily assembled on a hub, a time of centering may be relatively much reduced, and a superior centering quality may be obtained.

Additional features and utilities of the present general inventive concept will be set forth in part in the description which follows and, in part, will be obvious from the description, or may be learned by practice of the present general inventive concept.

According to a feature of the present general inventive concept, a method of centering a disk of a hard disk drive includes arranging a disk on an upper end portion of a hub on which a plurality of disks are rotatably assembled, and assembling the disk on the hub by vibrating the hub.

The method may further include arranging a spacer on the upper end portion of the hub, and assembling the spacer on the hub by vibrating the hub.

The operations of the arranging of a spacer, the assembling of the spacer, the arranging of a disk, and the assembling of the disk may be sequentially repeated a plurality of times to sequentially stack the plurality of disks along the hub such that each of the disk contact an upper surface of each of a plurality of spacers.

A gap between an outer circumferential surface of the hub and an inner diameter of the disk may have a width ranging from about 1 µm to about 10 µm.

The hub may be a hub of a spindle motor of the hard disk drive. During assembling one or more disks on the hub, the hub may be vibrated as a vibration generation unit coupled to a base of the hard disk drive vibrates the base.

The hub may be a hub of an offline servo track writer of an offline servo track write (OLSTW) process, and the offline servo track writer may further include a flange portion provided in a lower end of the hub and supporting a spacer disposed at the lowermost side, and a mounting portion provided by extending toward the opposite side to the hub with respect to the flange portion.

The offline servo track writer may further include a hub housing to support the mounting portion and, in the assembling of the disk on the hub, the hub is vibrated as a vibration generation unit coupled to the hub housing vibrates the hub housing.

In the assembling of the disk on the hub, the hub may be vibrated as a vibration generation unit coupled to the mounting portion vibrates the mounting portion.

The vibration generation unit may generate a high frequency displacement in the hub.

The vibration generation unit may generate a high frequency displacement in an upward direction in the hub by a voltage that is externally applied and, in the assembling of the disk on the hub, the hub may be vibrated by applying a high frequency displacement in an upward direction to the hub by increasing a voltage to a preset voltage during a preset first time so that the disk is relatively lowered with respect to the hub, and by applying a high frequency displacement in a downward direction by decreasing a voltage to a preset voltage during a second time that is longer than the preset first time so that the disk is relatively lowered downwardly with the hub.

The vibration generation unit may include a piezoelectric device.

The vibration may be generated in a vertical direction or a horizontal direction.

In another feature, a disk holder to hold a plurality of disks comprises a flange portion including a first surface to support a flat portion of a disk and including a second surface, a hub extending from the first surface of the flange to engage a through-hole of the disks to center the disks with respect to the flange portion, and a mounting portion extending from the second surface of the flange portion and in the opposite direction from the hub to be coupled to a disk rotation driving unit that rotates the disk holder.

In yet another feature, a servo track writer comprises a disk rotation driving unit to generate a rotation about an axis, and a disk holder to hold a plurality of disks. The disk holder comprises a flange portion including a first surface to support a flat portion of a disk and including a second surface, a hub extending from the first surface of the flange to engage a through-hole of the disks to center the disks with respect to the flange portion, and a mounting portion extending from the second surface of the flange portion and in the opposite direction from the hub and being coupled to the disk rotation driving unit. The servo track writer further includes a vibration generation unit coupled to the mounting portion of the disk holder to vibrate the hub in at least one of a vertical direction and a horizontal direction.

In still another feature of the general inventive concept, a hard disk drive comprises a base, a disk holder including a flange portion disposed against the base, a hub extending from the flange to engage at least one of a spacer and a disk, and a vibration generation unit coupled to the base that vibrates the base in at least one of a vertical and a horizontal direction to induce a vibration of the hub.

BRIEF DESCRIPTION OF THE DRAWINGS

The above and/or other features of the present general inventive concept will become apparent and more readily appreciated from the following description of the exemplary embodiments, taken in conjunction with the accompanying drawings, in which.

DETAILED DESCRIPTION OF THE EMBODIMENTS

Figure 1:
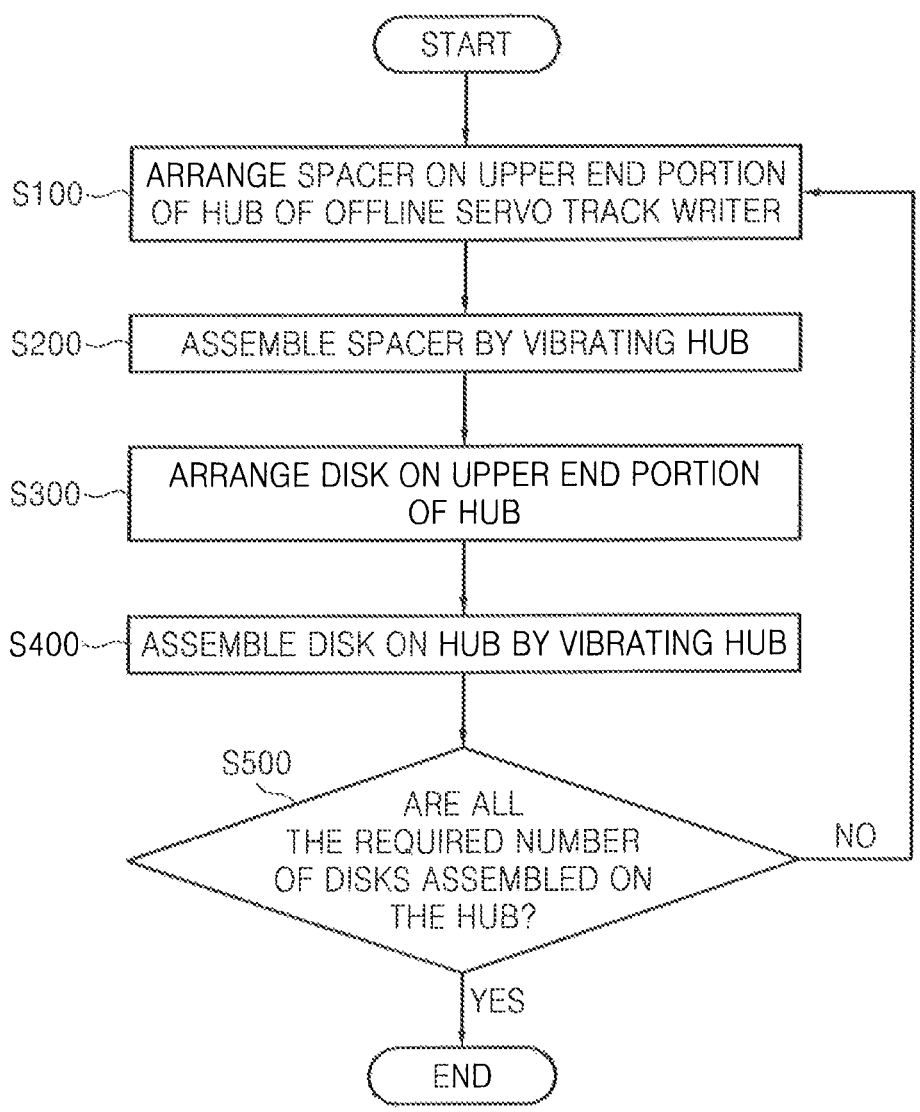
FIG. 1 is a flowchart illustrating an exemplary method of centering a disk of an HDD according to the present general inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

A method of centering a disk of a hard disk drive (HDD) according to an exemplary embodiment of the present general inventive concept is used to center a disk and a spacer with respect to a hub 71 in a drive assembly process or a servo track write (STW) process. According to an exemplary method, a conventional gap D between a hub and a disk/spacer may be reduced to a level of several micrometers so that, when the disk/spacer is stacked on the hub, they may be centered by themselves and no additional centering process is needed. The gap D may have a width ranging, for example, from about 1 µm to about 10 µm. The gap D denotes an interval between an inner circumferential surface of a disk through-hole 11a to stack the disk/spacer, and an outer circumferential surface of the hub 71. In an exemplary embodiment, the gap D may be disposed between an outer circumferential surface of the hub 71 and an inner diameter of the disk 11.

As illustrated in the drawings, exemplary methods of centering a disk of an HDD according to the present general inventive concept may perform centering by inserting a plurality of disks 11 and spacers 77 around a hub 71 of an offline servo track writer 60 in order to write servo information to the disks 11 of an offline servo track write (OLSTW) process.

Thus, an offline servo track writer employing the methods of centering a disk of an HDD according to an exemplary embodiment and another exemplary of the present general inventive concept will be described with reference to FIGS. 2-4.

The offline servo track writer 60 according to an exemplary embodiment includes a bed 61, a disk holder 70 provided above the bed 61 where disks 11 to record servo track information are stacked, a disk rotation driving unit 62 coupled to the disk holder 70 to rotate the disks 11, a head unit 80 having a plurality of servo track write heads 81 to write servo track information to recording surfaces of the disks 11, and a head unit driving unit 63 coupled to the head unit 80 to drive the head unit 80. The a head unit driving unit 63 drives the head unit 80 to a predetermined work position such that the servo track write heads 81 may be positioned in a spacing between adjacent disks 11. Accordingly, the write head 81 may write the servo track information to a corresponding disk.

The bed 61 may support the offline servo track writer 60. More specifically, the disk holder 70 to stack the above-described disks 11, the disk rotation driving unit 62, the head unit 80, and the head unit driving unit 63 are supported on the bed 61. Although the offline servo track writer 60 includes an exemplary shape illustrated in FIG. 2, the shape of the servo track writer 60 is not limited thereto.

The servo track writer 60 may further include a disk holder housing 90. The disk holder housing 90 includes a cover 91 and a plurality of ribs 92 defining slots 93 which may receive a corresponding disk 11. Accordingly, the disks 11 may be protected by the surrounding ribs 92. The cover 91 may be coupled to an end of the disk holder housing 90 adjacent to an end disk 11. The cover 91 may further include an opening to receive a spacer 77, a clamp 74 and a clamp coupling screw 75, which are described in greater detail below.

The disk rotation driving unit 62 rotates the disk holder 70, thereby rotating the disks 11 stacked on the disk holder 70. A typical rotary motor may be used as the disk rotation driving unit 62. For example, although not illustrated, the disk rotation driving unit 62 may include a rotary chuck that is rotationally coupled to the disk holder 70 to rotate the disk rotation driving unit 62.

Figure 4:
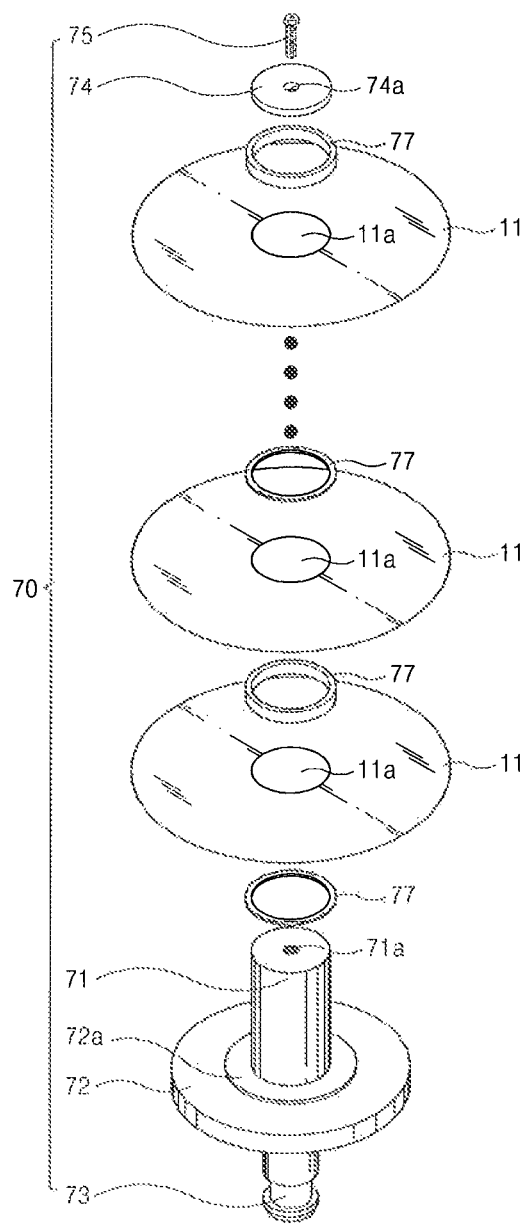
FIG. 4 is an exploded perspective view of the disk holder, the disk, and the spacer of FIG. 3.
Figure 5:
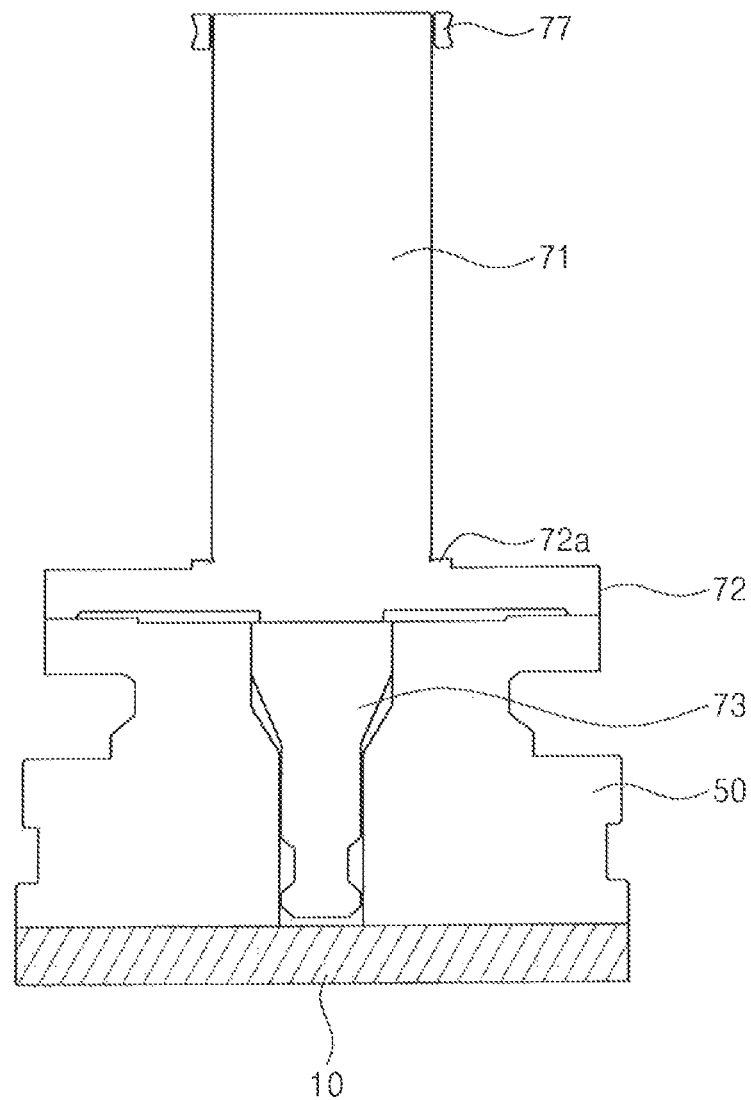
FIGS. 5-9 illustrate a process of inserting the disk and the spacer around a hub according to an exemplary method of centering a disk of an HDD according to an exemplary embodiment of the present general inventive concept.
Figure 6:
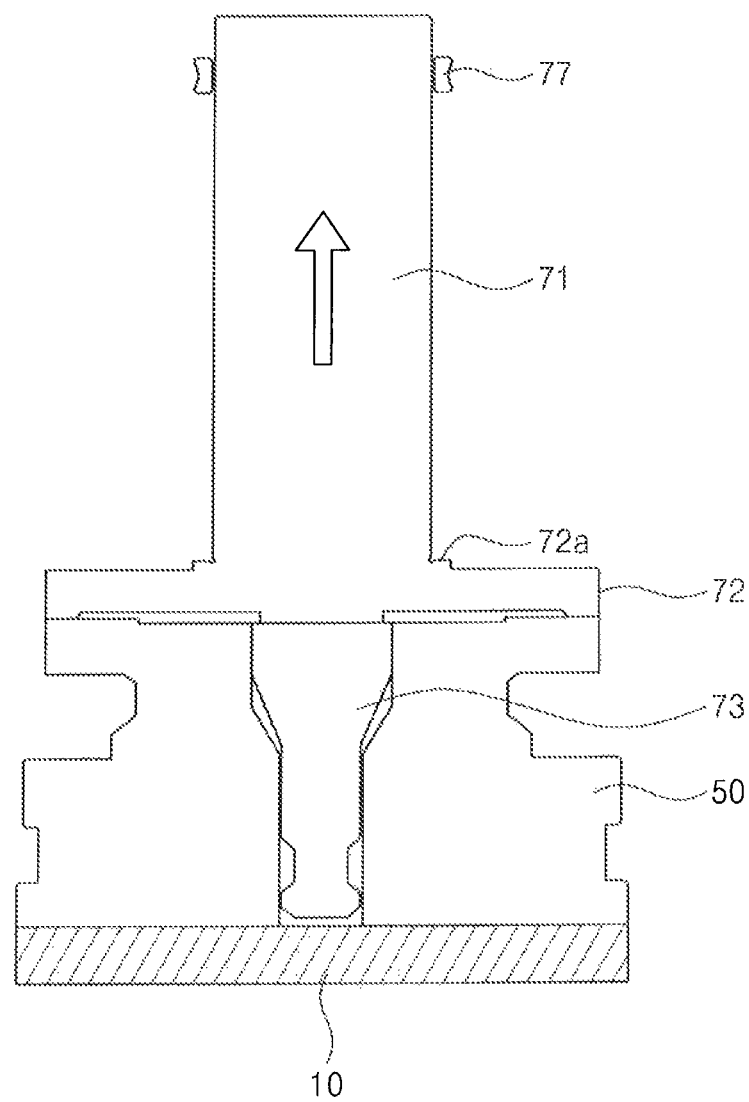
Figure 7:
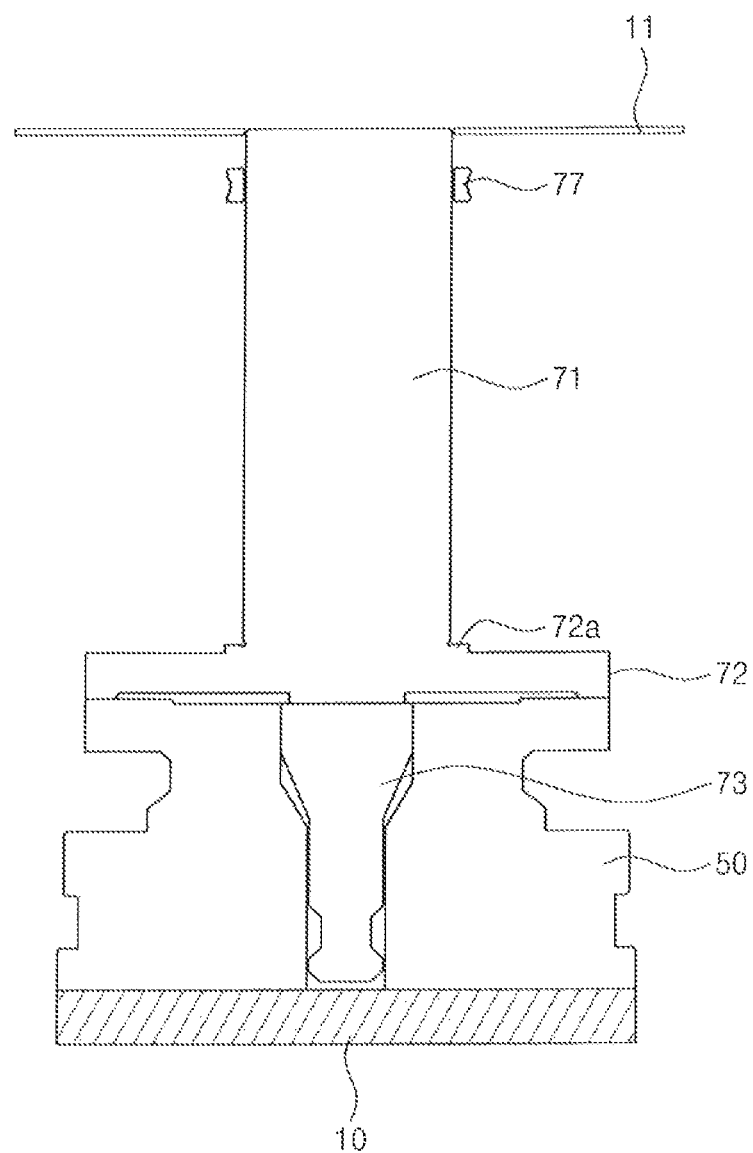
Figure 8:
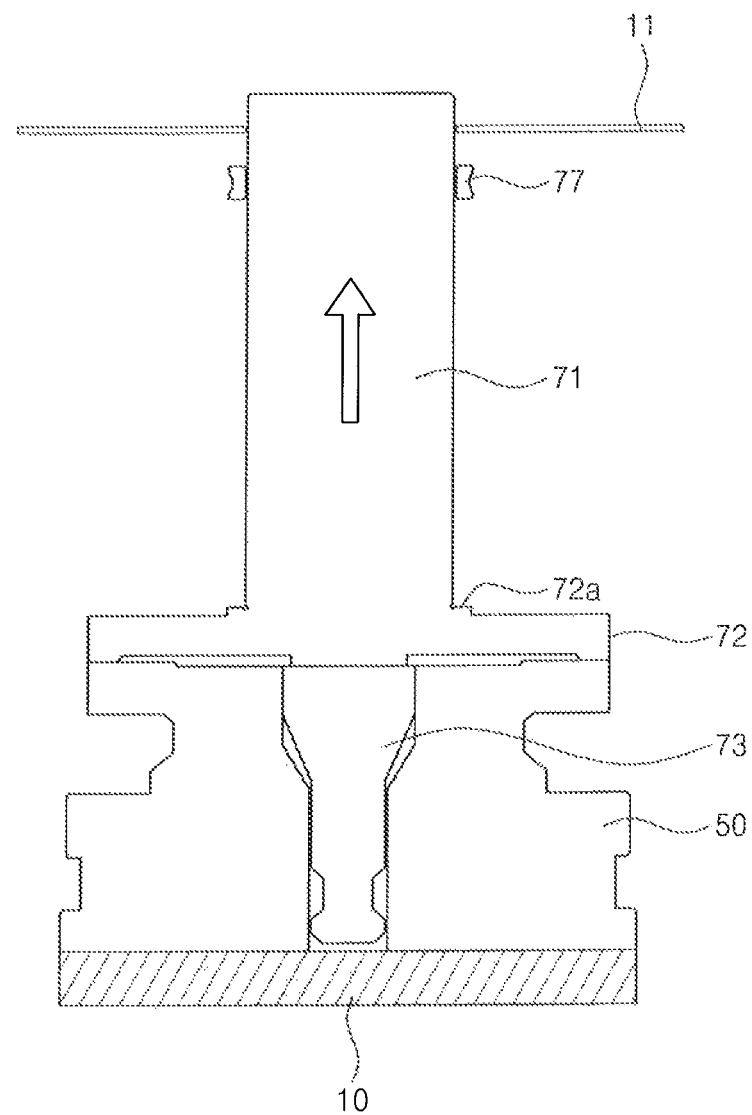

As illustrated, for example, in FIG. 4, the disk holder 70 includes a hub 71 on which the disks 11 to record servo track information are stacked. The disk holder 70 further includes a flange portion 72 provided at a lower end of the hub 71 to support the lowermost spacer 77. A mounting portion 73 is provided at the side facing the hub 71 with respect to the flange portion 72. The mounting portion 73 may be coupled to a rotary chuck of the disk rotation driving unit 62, as mentioned above. More specifically, a clamp 74 having a clamp through-hole 74a may be arranged above the uppermost spacer 77. A clamp coupling screw 75 may be disposed through the clamp through-hole 74a such that the clamp 74 and clamp coupling screw 75 are coupled to the hub 71. Accordingly, the disks 11 and the spacers 77 may be positioned between the flange portion 72 and the clamp 74 and supported against the hub.

As discussed above, the hub 71 may support the disks 11 such that the disks 11 are substantially stacked one next to the other. The hub 71 may have, for example, a column shape having a certain length. A disk through-hole 11a is formed in each of the disks 11 so that the disks 11 may be stacked next to each other, while being supported on the hub 71.

The flange portion 72 supports the lowermost spacer 77. The flange portion 72 may be formed, for example, in a shape of a circular plate having a certain diameter. The flange portion 72 may further include a protruding disk portion 72a that protrudes upwardly from a central area of the flange portion 72 to support the lowermost spacer 77. Alternatively, the protruding disk portion 72a may not be formed such that the protruding disk portion 72a may be regarded as a portion of the flange portion 72.

Figure 2:
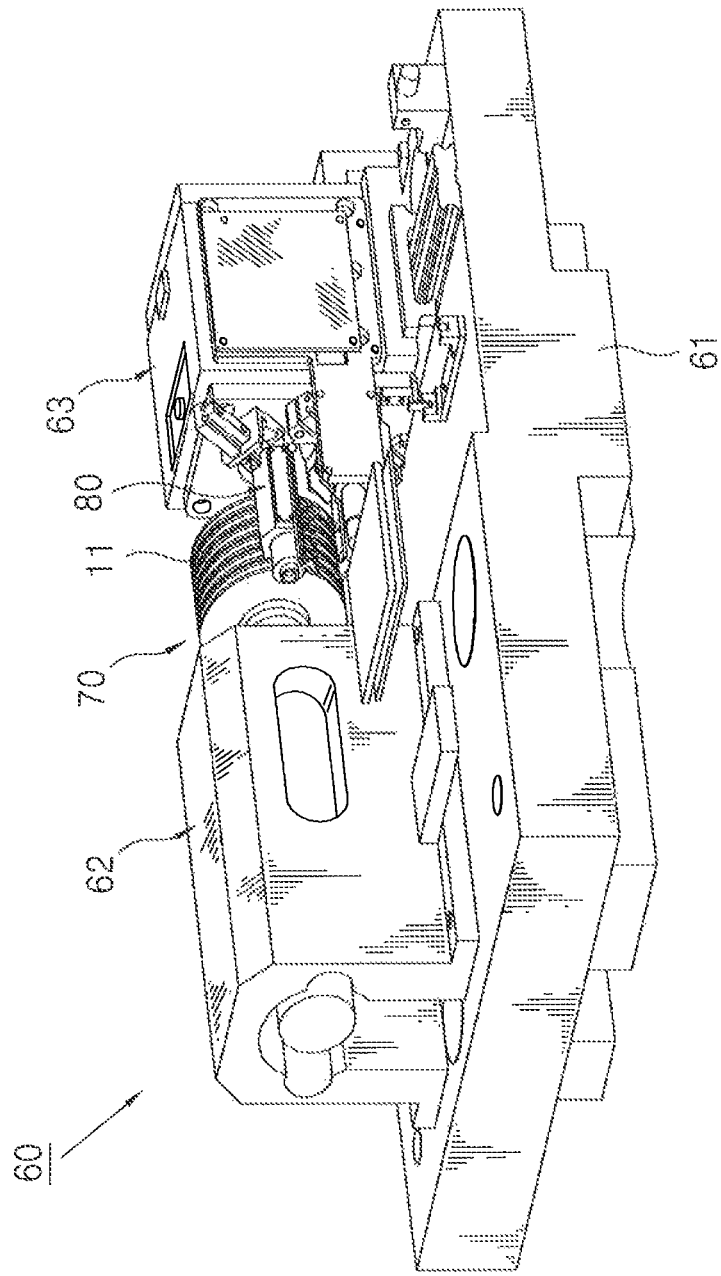
FIG. 2 is a perspective view of an offline servo track writer employing exemplary methods of centering a disk of an HDD according to an exemplary embodiment of the present general inventive concept.
Figure 3:
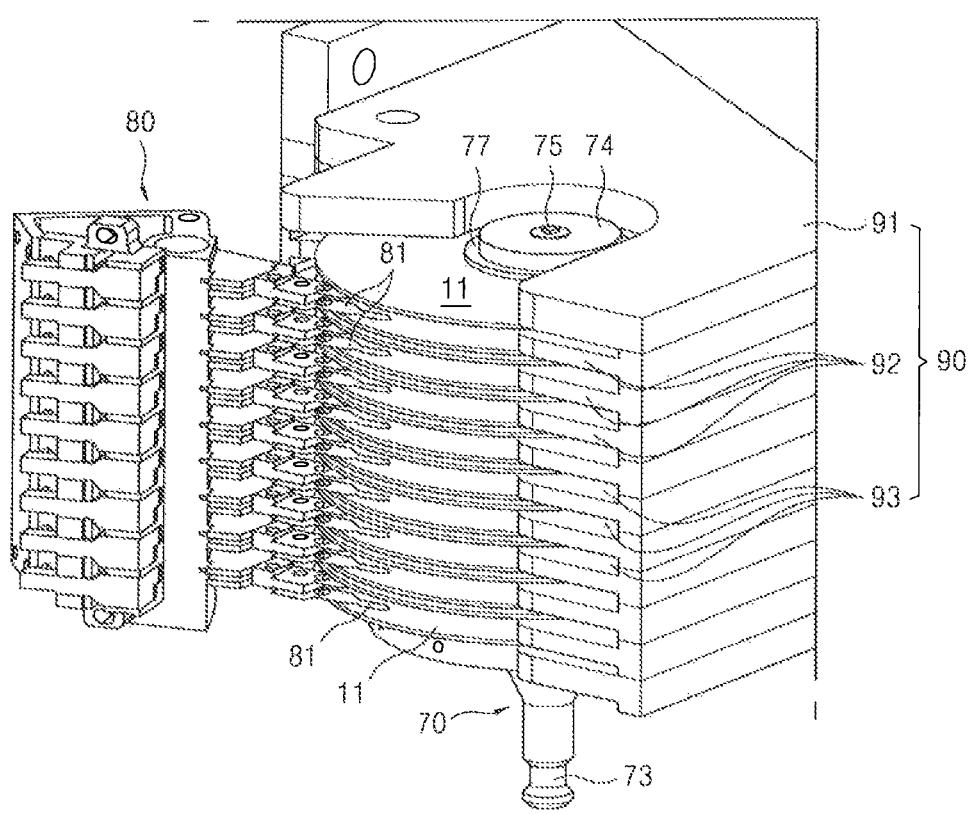
FIG. 3 is a perspective view of a disk holder area provided in the offline servo track writer of FIG. 2.

As mentioned above, the mounting portion 73 may be coupled to the disk rotation driving unit 62 of FIG. 2. As the mounting portion 73 is coupled to the disk rotation driving unit 62, when the disk rotation driving unit 62 is rotated, the disk holder 70 rotates accordingly so that the disks 11 stacked on the disk holder 70 may be rotated.

The clamp 74 may be arranged at the top of the uppermost spacer 77. Accordingly, the disks 11 and the spacers 77 may be prevented from escaping between the flange portion 72 and the clamp 74. In an exemplary embodiment, the clamp 74 may be manufactured to have a diameter larger than that of the spacers 77.

The clamp coupling screw 75 is coupled to a screw-hole 71a of the hub 71 via a through-hole 74a of the clamp 74, thereby supporting the disks 11 and the spacers 77 between the flange portion 72 and the clamp 74.

The methods of centering a disk of an HDD according to the exemplary embodiments of the present general inventive concept may be applied when the disks 11 and the spacers 77 are stacked, or assembled, on the hub 71 before the mounting portion 73 is coupled to disk rotation driving unit 62.

Thus, the offline servo track writer 60 according to an exemplary embodiment may further include a hub housing 50 and a vibration generation unit 10, which will be discussed in greater detail below. The hub housing 50 may receive the mounting portion 73 inserted therein to support and facilitate stacking of the disks 11, as illustrated in FIGS. 5-9. Additionally, the hub housing 50 may be removed after the centering of a disk of an HDD is complete.

The methods of centering a disk of an HDD according to exemplary embodiments of the present general inventive concept will be described in detail with reference to FIGS. 1, 5-9, and 10-15.

Referring to FIG. 1, an exemplary method of centering a disk of an HDD is illustrated. The method includes arranging the spacers 77 on an upper end portion of the hub 71 of the offline servo track writer 60 to write servo information to the disks 11 (S100), assembling the spacer 77 on the hub 71 by vibrating the hub 71 (S200), arranging the disks 11 on the upper end portion of the hub 71 (S300), and assembling the disk 77 on the hub 71 by vibrating the hub 71 (S400).

More specifically, the spacers 77 are arranged on the upper end portion of the hub 71 of the offline servo track writer 60 to write servo information to the disks 11 (S100). That is, the spacer 77 is arranged such that the through-hole 11a formed in the each of the disks 11 is partially inserted around the hub 71.

The vibration generation unit 10 may be coupled to the bottom surface of the hub housing 50, as illustrated, for example, in FIGS. 5-9. Alternatively, the vibration generation unit 10 may be coupled directly to the mounting portion 73, as illustrated, for example, in FIGS. 10-14. A voltage may be applied to the vibration generation unit 10 to generate a high frequency displacement in a vertical and/or horizontal direction in the hub 71. The vibration generation unit 10 may include, but is not limited to, a piezoelectric device and a voice coil motor. For example, FIGS. 5, 6, 10 and 11 illustrate a vibration generation unit 10 generating a high frequency displacement of the hub 71 in a vertical direction. While the voltage is applied to the vibration generation unit 10, the hub 71 vibrates in the vertical direction so that the spacer 77 is assembled on the hub 71 (S200).

Referring now to an exemplary process of assembling the disks 11 to the hub 71, the vibration generation unit 10 may apply a high frequency or ultrasonic displacement in the hub 71 to allow the hub 71 to vibrate in a vertical and/or horizontal direction according to the displacement of the disks 11, similar to the process of assembling the spacers described in detail above. As a result, the vibration of the hub 71 couples the spacers 77 to the disks 11, which are inserted around and stacked on the hub 71, as illustrated, for example, in FIGS. 7, 8, 12 and 13. As mentioned above, the vibration generation unit 10 may include, but is not limited to, a piezoelectric device and a voice coil motor.

In exemplary embodiments, while the amount of displacement varies according to the amount of a voltage that is externally applied, the vibration generation unit 10 may be configured to generate vibration in a vertical direction by generating a displacement in the vertical direction, vibration in a horizontal direction by generating a displacement in the horizontal direction, or vibrations both in the vertical and horizontal directions by generating displacements in the vertical and horizontal directions.

Unlike conventional technology, since the vibration generation unit 10 vibrates the hub 71, and thus the spacers 77 and the disks 11 assembled on the hub 71, as described above, even when a gap D between the hub 71, and the spacers 77 and the disks 11, is managed to be less than several micrometers, the spacers 77 and the disks 11 may be easily assembled on the hub 71. Additionally, a time of centering may be substantially reduced. Furthermore, a superior centering quality is achieved since the amount of imbalance is reduced, as compared to the conventional technology.

According to exemplary embodiments, a voltage waveform having a saw-toothed shape may be output to the vibration generation unit over a continuous period of time. Accordingly, the vibration generation unit 10 induces a vibration of the hub 71. When vibration in the vertical direction is to be generated, not by equalizing, but by differentiating a time to increase a voltage and a time to decrease a voltage, the spacers 77 and the disks 11 may be easily assembled on the hub 71.

Figure 15:
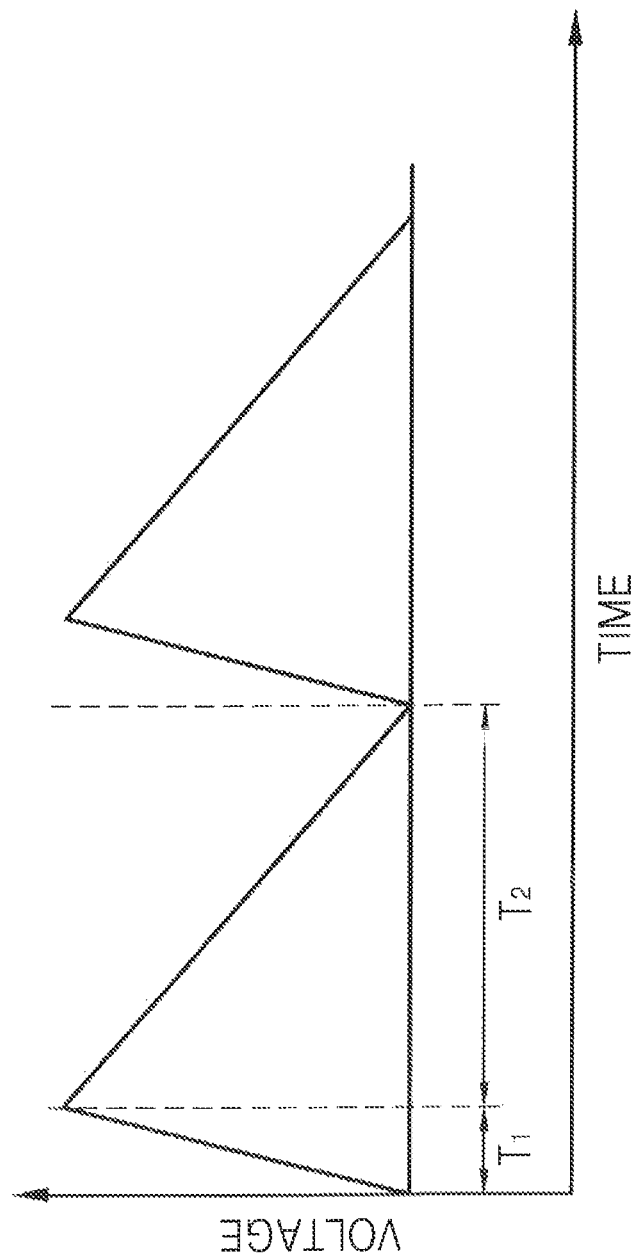
FIG. 15 is a graph showing a change in voltage applied to a vibration generation unit in exemplary methods of centering a disk of an HDD according to an exemplary embodiment of the present general inventive concept.

According to the voltage waveform of a saw-toothed shape, in which there is a difference between the time to increase a voltage and the time to decrease a voltage, as illustrated in FIG. 15, a high frequency displacement may be applied to the hub 71 in an upward direction by increasing a voltage relatively rapidly to a preset voltage during a first time $T_1$ so that the spacers 77 and the disks 11 may relatively descend with respect to the hub 71 due to the upward high frequency displacement of the hub 71. Also, to descend the spacers 77 and the disks 11 with the hub 71, a voltage may be relatively gradually decreased to a preset voltage during a second time $T_2$ that is longer than the first time $T_1$ so that a downward displacement is applied to the hub 71, thereby vibrating the hub 71.

More specifically, in an initial stage in which the spacers 77 and the disks 11 are partially inserted around the upper end portion of the hub 71, when a rapid voltage waveform is applied to the vibration generation unit 10 during the first time $T_1$, a rapid displacement in the upward direction is generated in the hub 71. At this moment, since the spacers 77 and the disks 11 relatively has a characteristic to remain at the initially inserted position due to inertia, a relative displacement is generated between the hub 71 and the spacers 77 or the disks 11, so that the spacers 77 or the disks 11 may be further inserted around the hub 71 compared to the initial stage.

Alternatively, when a relatively gradual voltage waveform, as compared to that of the first time $T_1$, is applied to the vibration generation unit 10 during the second time $T_2$, no relative displacement is generated between the hub 71 and the spacers 77 or the disks 11 so that the hub 71 and the spacers 77 or the disks 11 may be moved downward.

In the centering method, after one of the spacers 77 is inserted, one of the disks 11 may be arranged at the upper end portion of the hub 71 (S300). For example, the disk 11 is arranged such that the through-hole 11a formed at the central portion of the disk 11 may be partially inserted around the hub 71.

As in operation S200, a voltage is applied to the vibration generation unit 10 to generate a displacement in the vertical direction in the hub 71. The voltage waveform applied to the vibration generation unit 10 may be the same as that in the operation S200. Consequently, the disks 11 are assembled on the hub 71 in a way similar to the above-described assembly process of the spacers 77 (S400).

Figure 9:
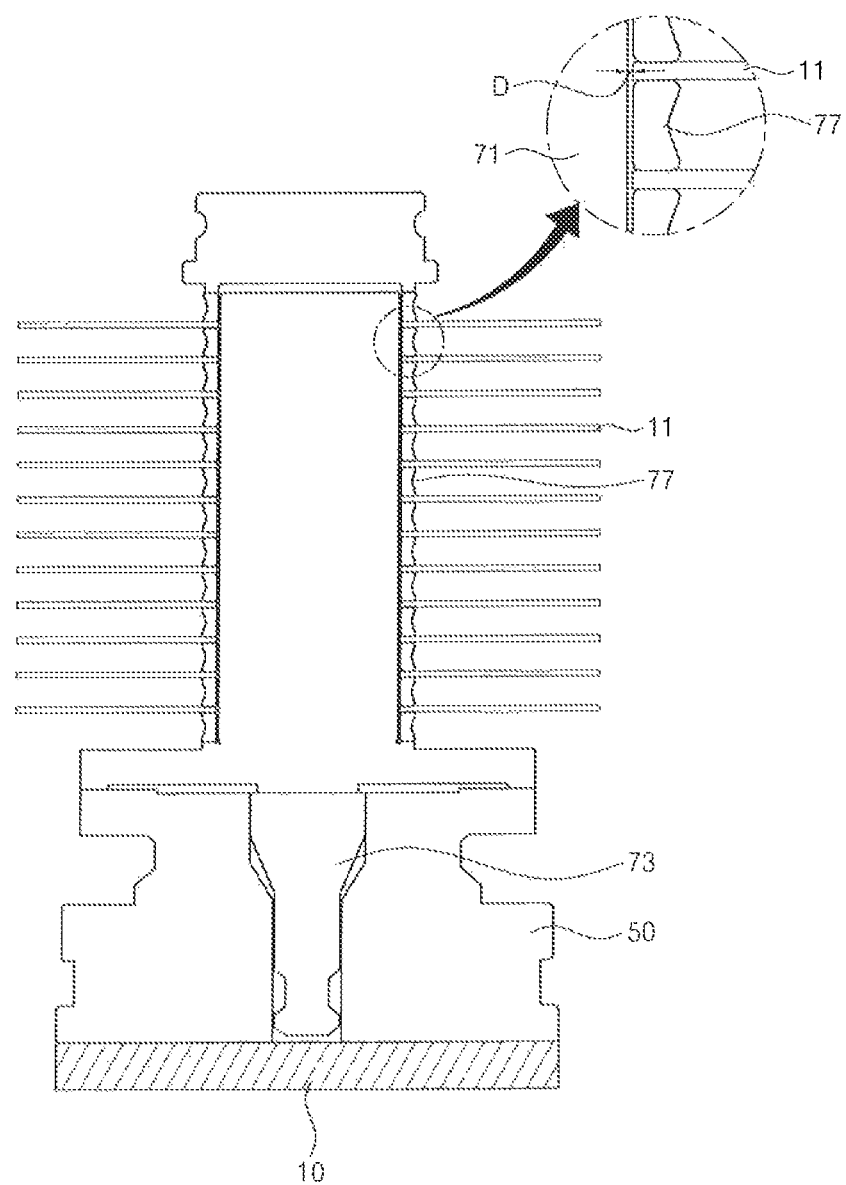
Figure 10:
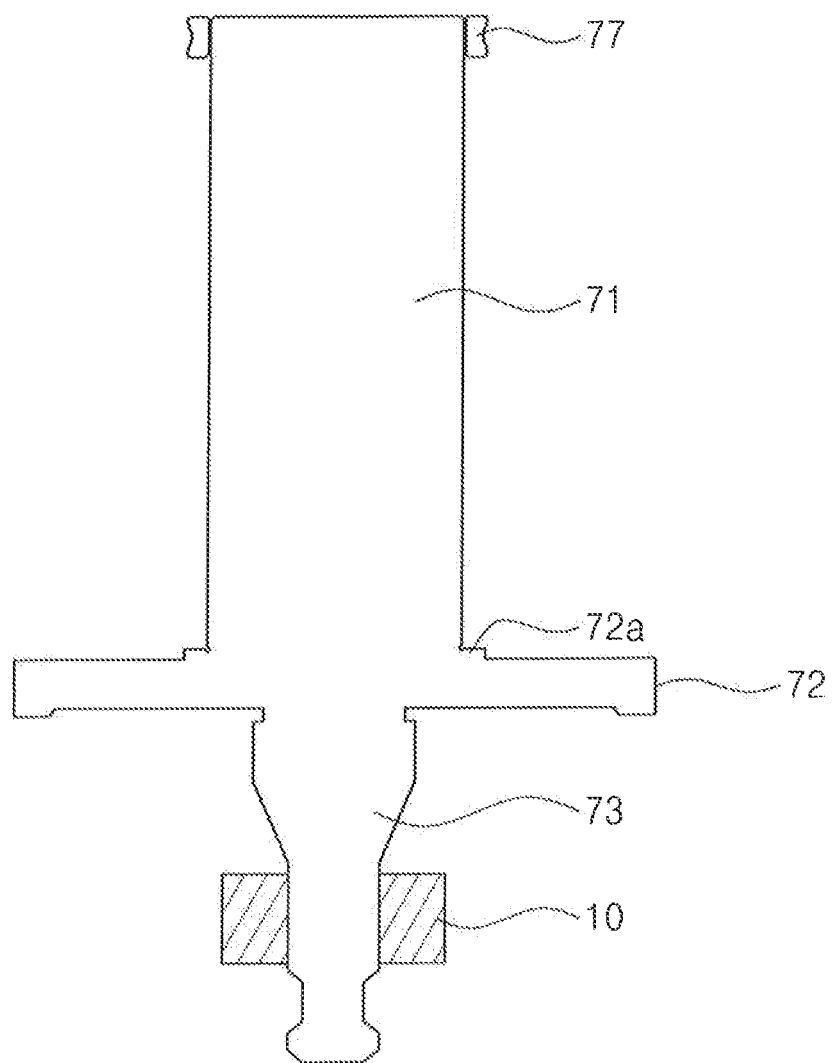
FIGS. 10-14 illustrate a process of inserting the disk and the spacer around a hub according to an exemplary method of centering a disk of an HDD according to another exemplary embodiment of the present general inventive concept.
Figure 11:
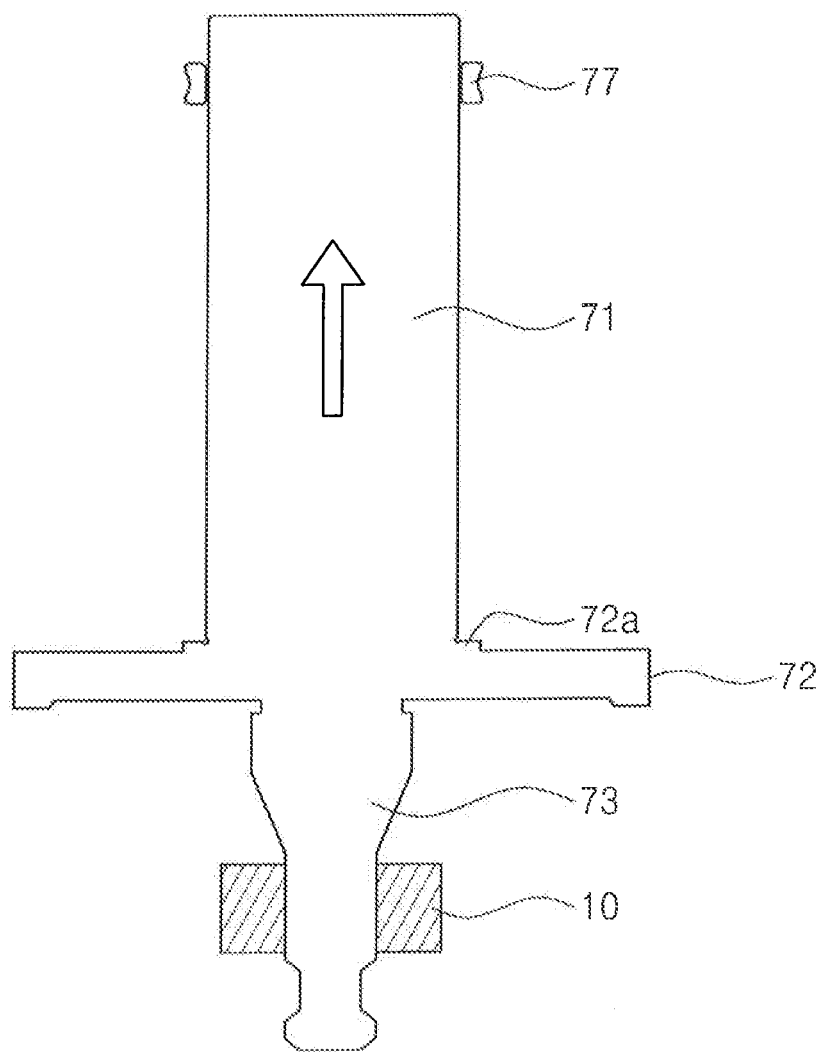
Figure 12:
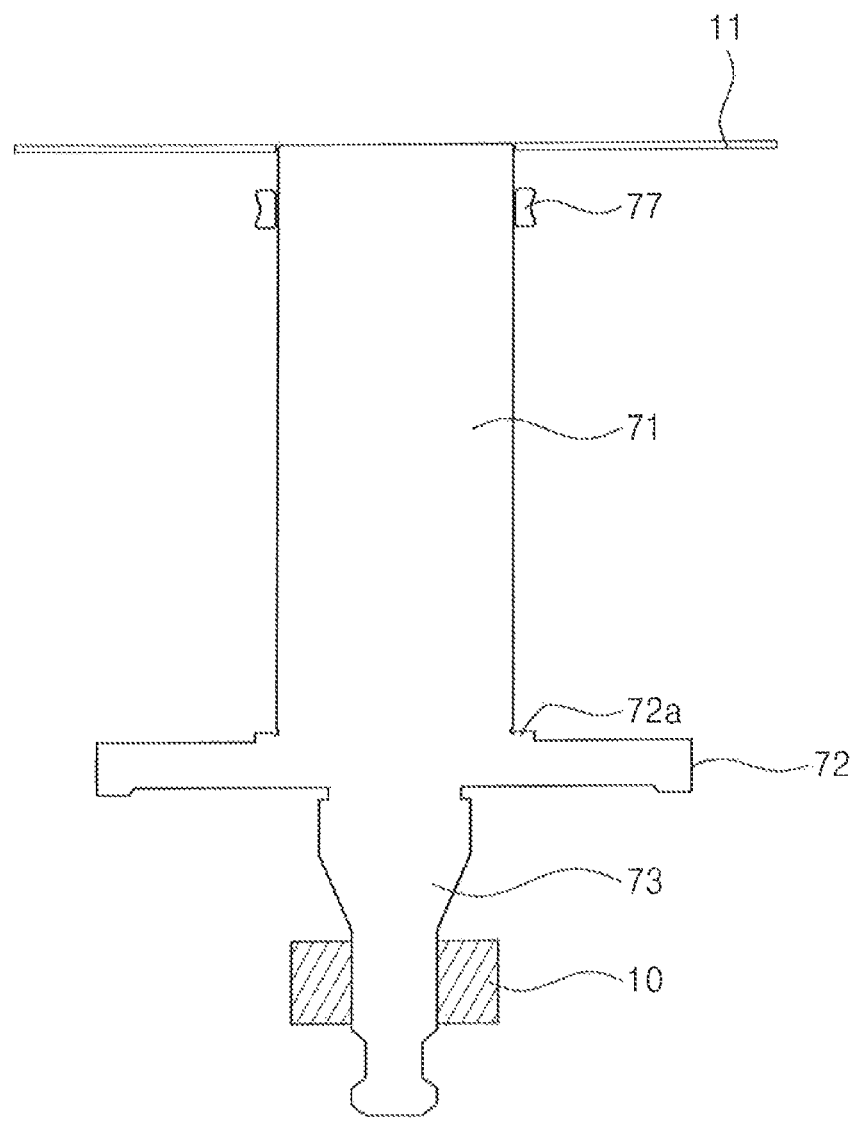
Figure 13:
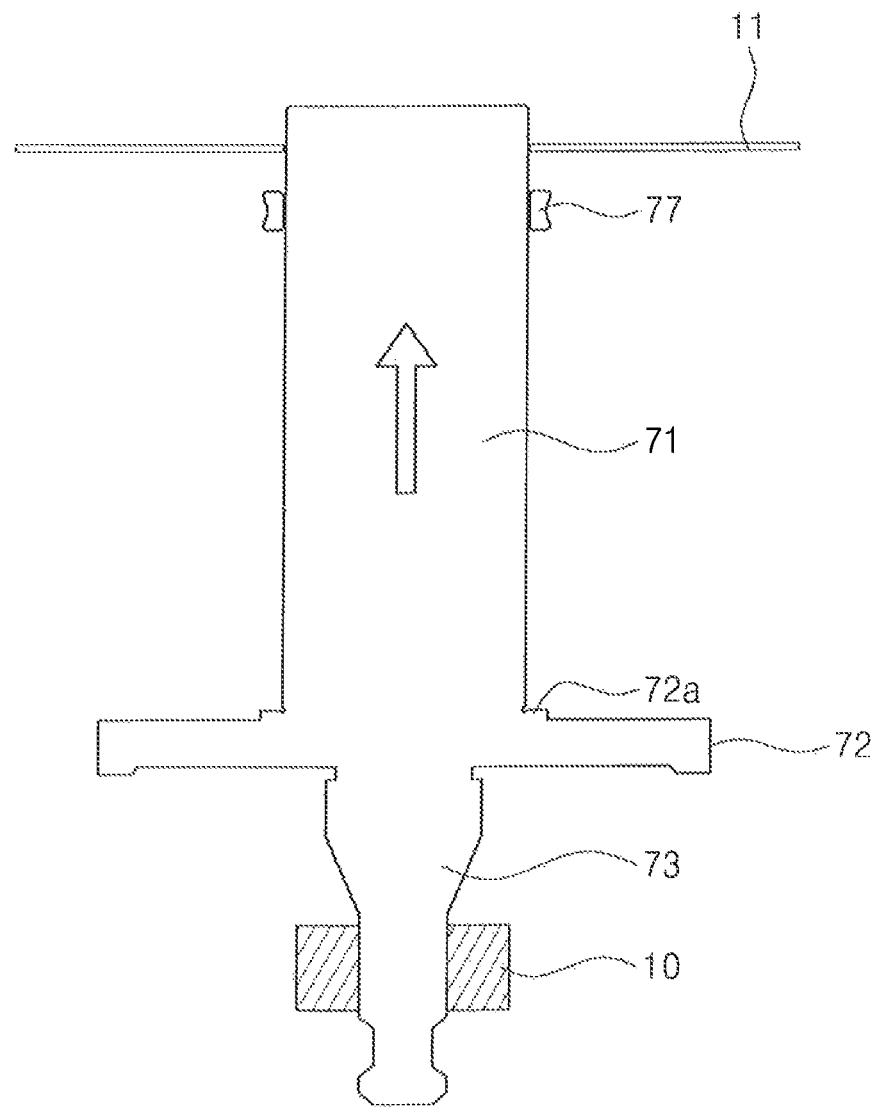
Figure 14:
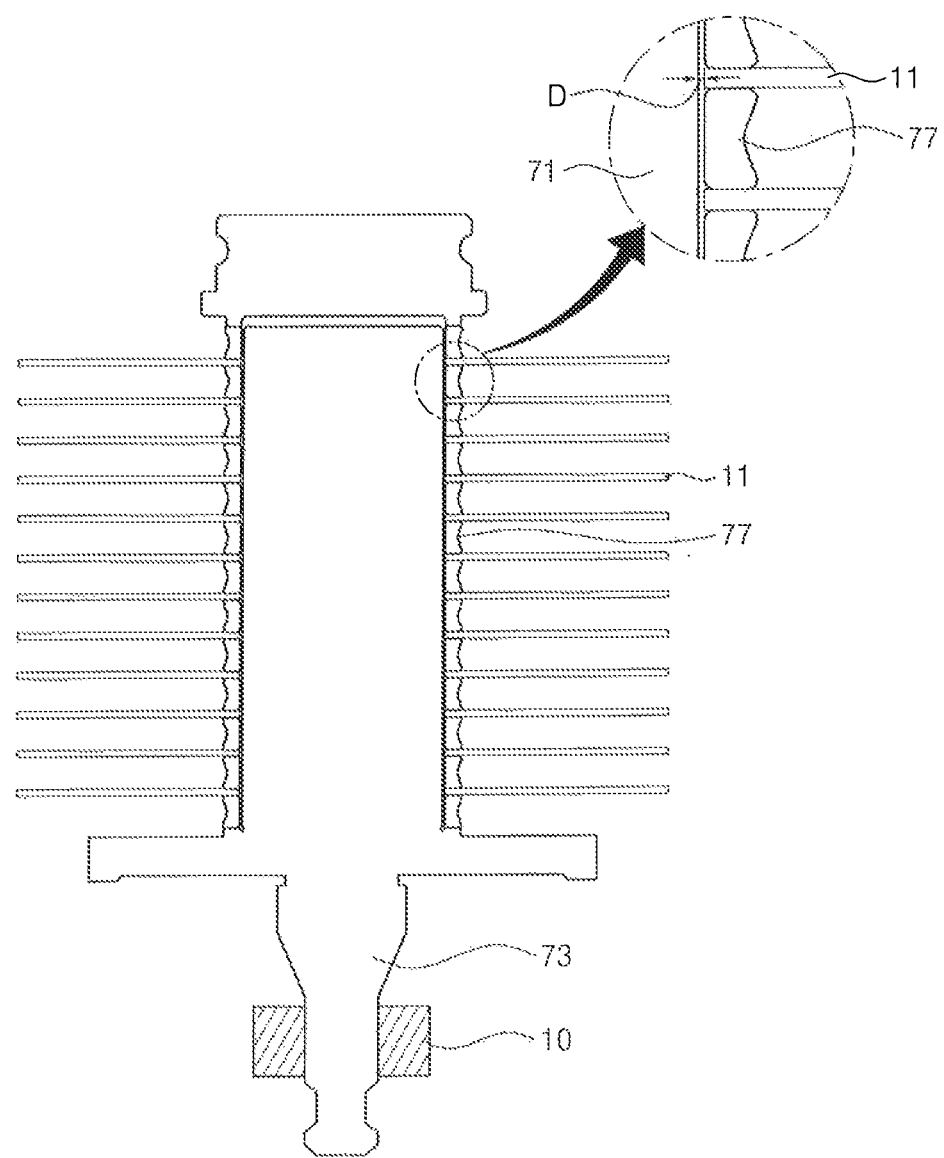

In operation S500, it may be determined whether the required number of the disks 11 are all assembled on the hub 71. If not, the operations from S100 through S400 are sequentially repeated a plurality of times. After the above process, as illustrated in FIGS. 9 and 14, the spacers 77 and the disks 11 are inserted around and stacked on the hub 71.

As described above, in the exemplary embodiments of the present general inventive concept, since the spacers 77 and the disks 11 are assembled on the hub 71 by vibrating the hub 71 using the vibration generation unit 10, compared to the conventional technology, the gap D having a width being less than several micrometers between the hub 71, and the spacers 77 and the disks 11, may be obtained. For example, the gap D may have a width ranging from about 1 µm to about 10 µm. Thus, centering is performed spontaneously at the same time when assembly is performed so that a separate centering process may not be needed. Since the quality of centering is determined by each part compared to the conventional separate centering method, superior and uniform centering quality may be achieved. Also, the ultrasonic vibration may remove dust from the hub 71 before stacking the spacers 77 and the disks 11. In addition, in a state where the spacers 77 and the disks 11 are already stacked, dust adhering to a surface of the hub 71 may be removed due to the ultrasonic vibration.

Figure 16:
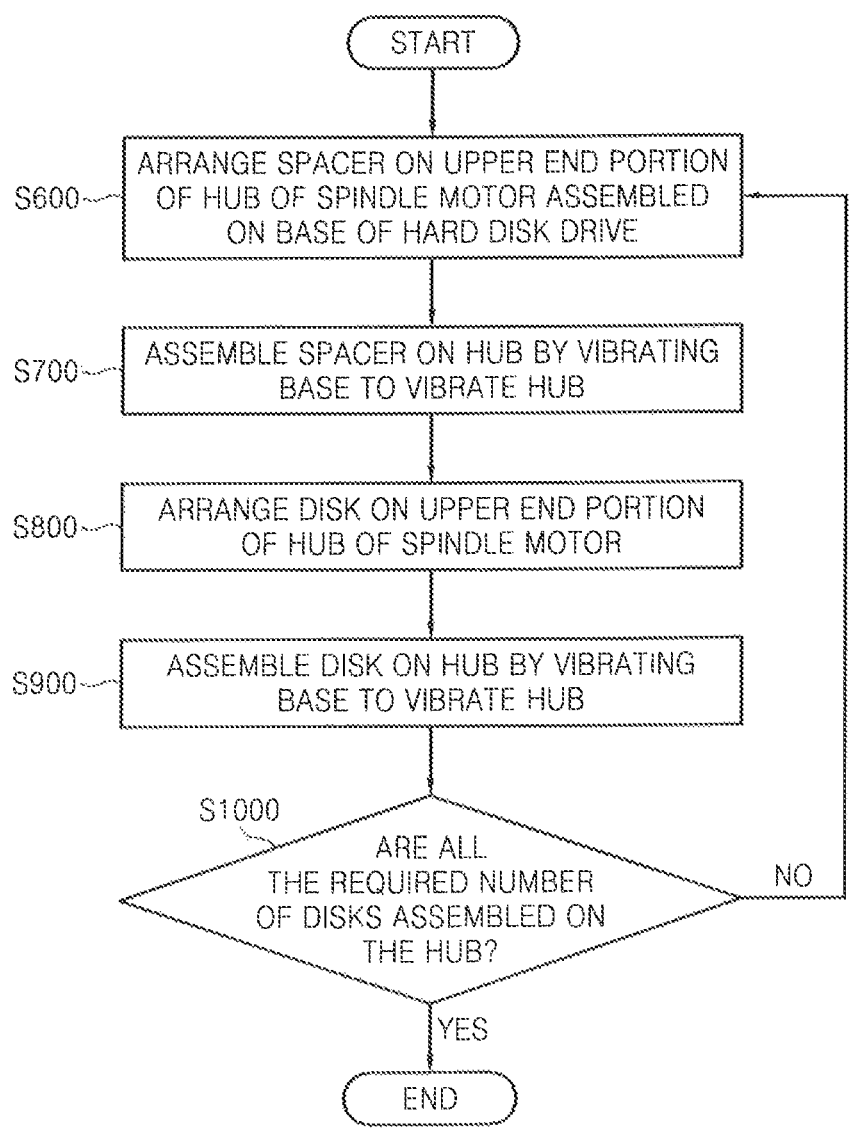
FIG. 16 is a flowchart illustrating an exemplary method of an HDD method to center a disk of an HDD according to another exemplary embodiment of the present general inventive concept.
Figure 17:
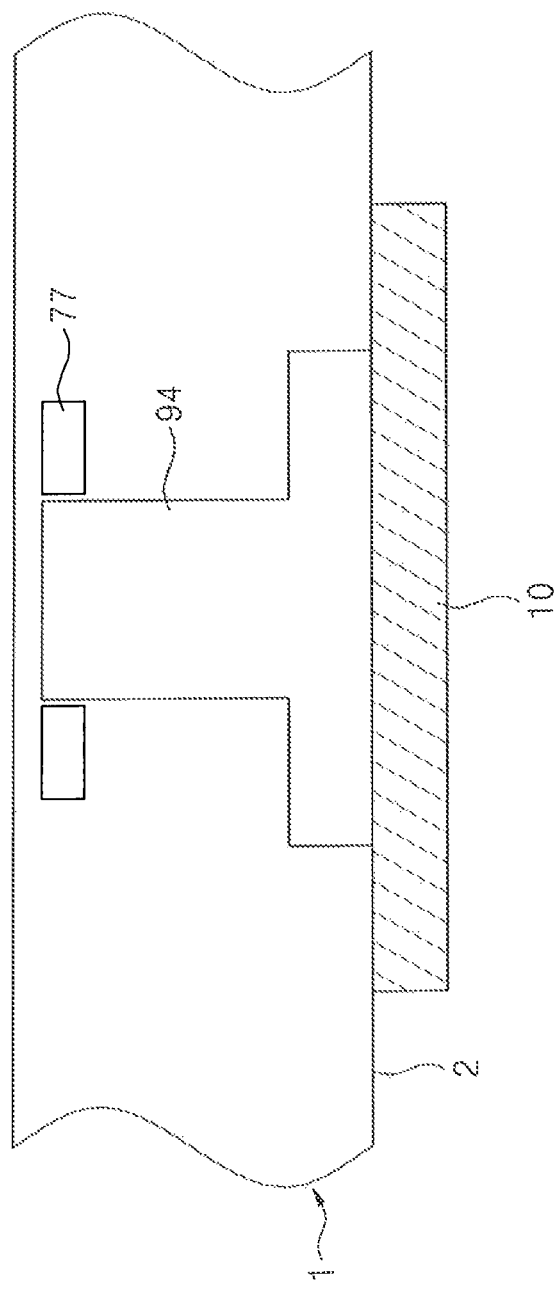
FIGS. 17-21 illustrate a process of inserting the disk and the spacer around a hub according to the exemplary method of centering a disk of an HDD a illustrated in FIG. 16.
Figure 18:
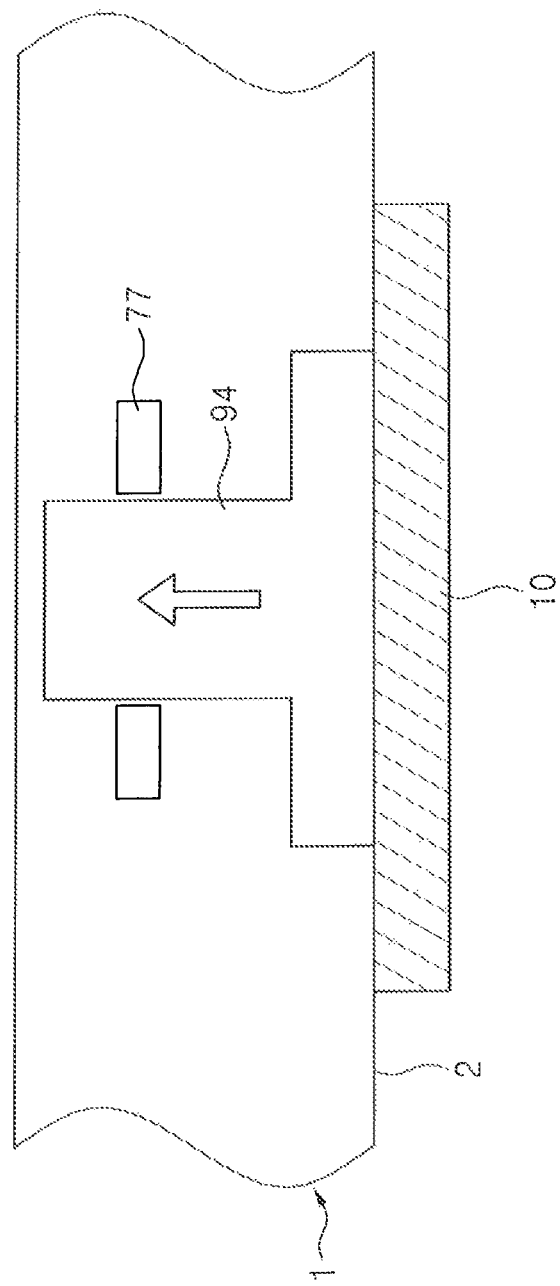
Figure 19:
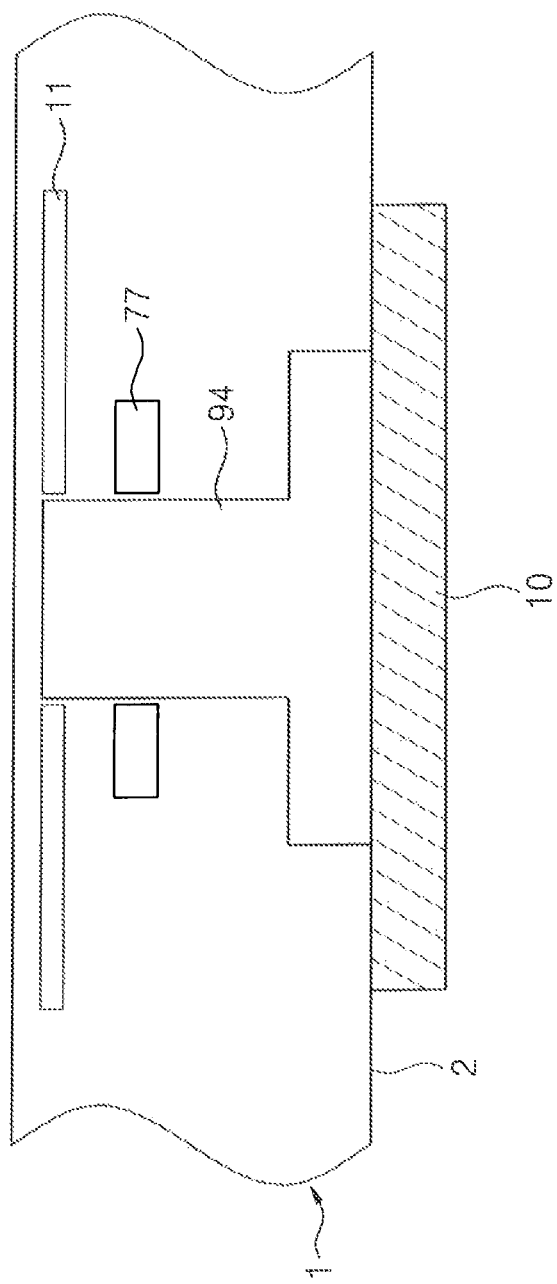
Figure 20:
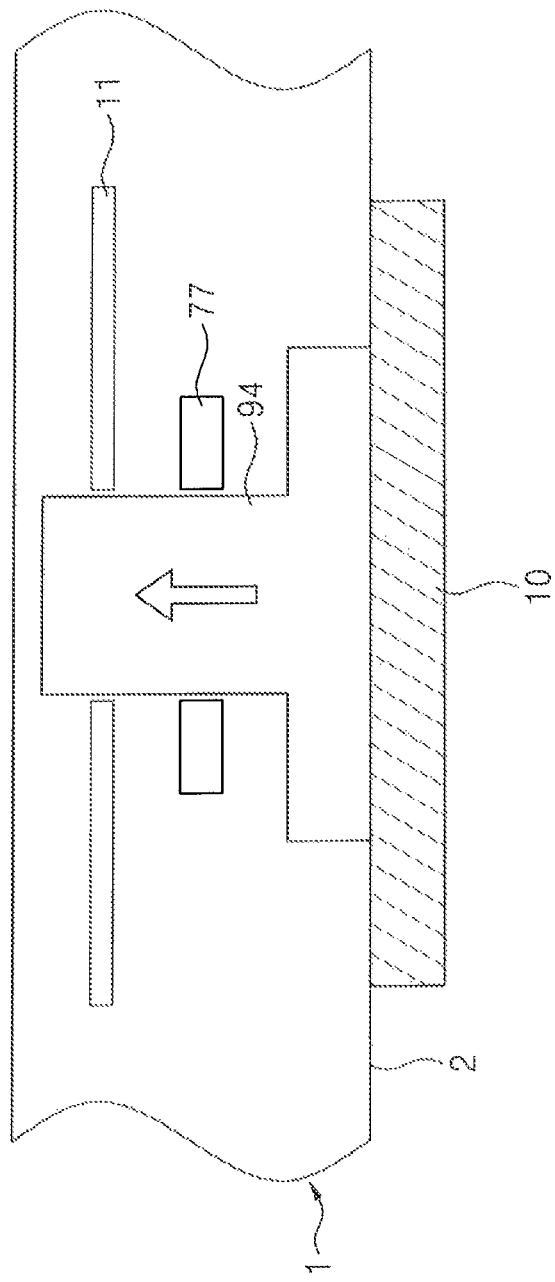
Figure 21:
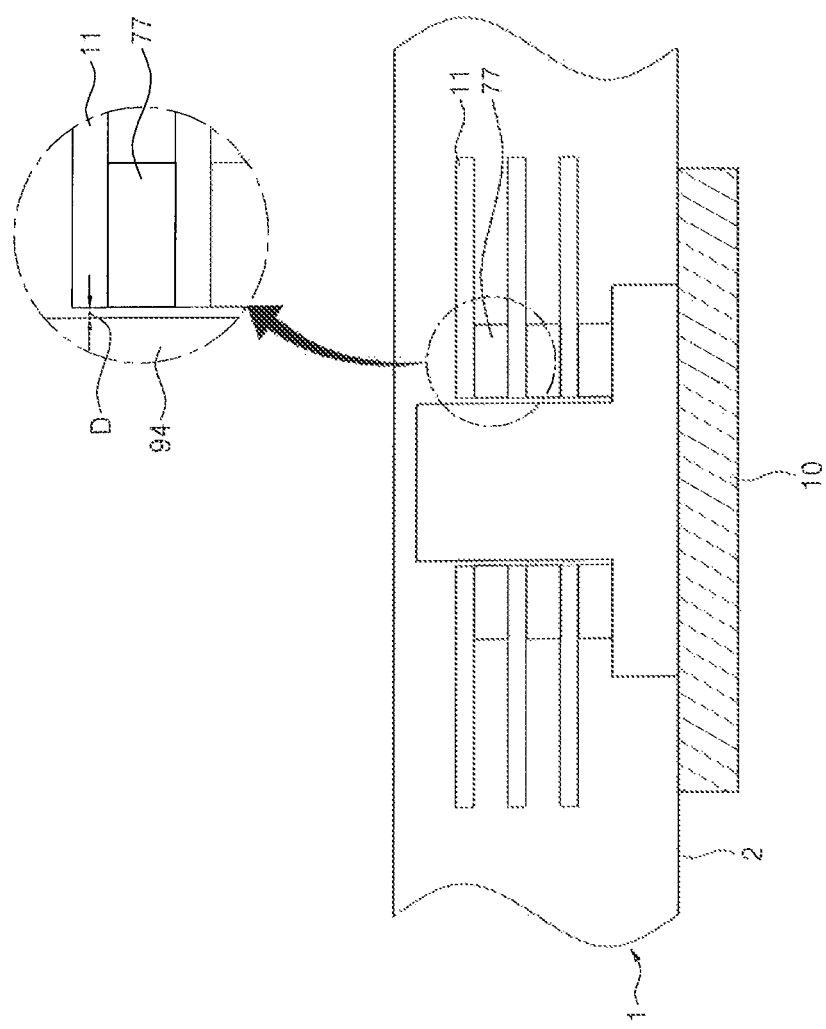

FIG. 16 is a flowchart illustrating an exemplary method of centering a disk of an HDD according to a third exemplary embodiment of the present general inventive concept. FIGS. 17-21 illustrate a process of inserting the disk and the spacer around the hub by the method of centering a disk of an HDD according to the third exemplary embodiment of the present general inventive concept.

Referring to FIGS. 16-21, according to the method of centering a disk of an HDD according to an exemplary embodiment of the present general inventive concept, unlike the above-described exemplary embodiments, vibration is applied to a base 2 of an HDD 1 in an assembly process of the HDD 1 to vibrate a spindle hub 94 of a spindle motor (not shown) so that the spacers 77 and the disks 11 may be sequentially inserted around and stacked on the hub 94 of the spindle motor.

More specifically, the present general inventive concept provides easy insertion of the disks 11 around the hub 94 such that the disks 11 may be stacked in a state where the gap D between the hub 94 of the spindle motor, and the spacers 77 and the disks 11, is reduced compared to a convention technology. According to another exemplary embodiment of the present general inventive concept, although it is the same as the above-described exemplary embodiments to reduce the gap D between the hub 94 of the spindle motor, and the spacers 77 and the disks 11, to be less than several micrometers unlike the conventional technology, the vibration generation unit 10 may alternatively vibrate the base 2 of the HDD 1. Accordingly, the spacers 77 and the disks 11 may be inserted around the hub 94 as they move downward along the hub 94 of the spindle motor.

The alternative exemplary method of centering a disk of an HDD mentioned above may include arranging one of the spacers 77 on the upper end portion of the hub 94 of the spindle motor assembled on the base 2 of the HDD 1 (S600), applying vibration to the base 2 to vibrate the hub 94 of the spindle motor, thereby assembling the spacer 77 on the hub 94 (S700), arranging one of the disks 11 on the upper end portion of the hub 94 of the spindle motor (S800), and applying vibration to the base 2 to vibrate the hub 94 of the spindle motor, thereby assembling the disk 11 on the hub 94 (S900).

More specifically, one of the spacers 77 is arranged on the upper end portion of the hub 94 of the spindle motor that is assembled on the base 2 of the HDD 1 (S600). That is, the spacer 77 is arranged such that the through-hole 11*a* formed at the central portion of the spacer 77 may be partially inserted around the hub 94.

Next, a voltage is applied to the vibration generation unit 10 that is coupled to the base 2 so that an upward high frequency displacement may be generated in the hub 94 of the spindle motor. When the voltage is applied to the vibration generation unit 10, the hub 94 is vibrated and thus the spacer 77 is assembled on the hub 94 (S700). The vibration generation unit 10 may be installed to simultaneously generate displacements in the vertical and horizontal directions of the hub 94.

As in the above-described exemplary embodiments, a voltage is applied to the vibration generation unit 10 based on the voltage waveform of a saw-toothed shape having a difference in the time to increase a voltage and the time to decrease a voltage, and thus, vibration is induced in the hub 94 by the vibration generation unit 10.

Accordingly, one of the disk 11 is arranged on the upper end portion of the hub 94 of the spindle motor (S800). That is, the disk 11 is arranged such that the through-hole 11*a* formed at the central portion of the disk 11 may be partially inserted.

Then, as in the operation S700, a voltage is applied to the vibration generation unit 10 to vibrate the hub 94 of the spindle motor. That is, a voltage is applied to the vibration generation unit 10 based on the voltage waveform of a saw-toothed shape having a difference in the time to increase a voltage and the time to decrease a voltage, and thus, vibration is induced in the hub 94 by the vibration generation unit 10. As a result, the disk 11 is inserted around the hub 94 in a way similar to the insertion process of the spacer 77 (S900).

Then, it is determined whether the required number of the disks 11 are all assembled on the hub 94 (S1000). If not, the operations from S600 through S900 are sequentially repeated a plurality of times. After the above process, as illustrated in FIG. 94, the spacers 77 and the disks 11 are inserted around and stacked on the hub 71.

As described above, according to exemplary methods of centering a disk of an HDD according to the present general inventive concept, disks and/or spacers may be easily assembled on a hub, a time of centering may be substantially reduced, and a superior centering quality may be obtained.

Although a few exemplary embodiments of the present general inventive concept have been shown and described, it would be appreciated by those skilled in the art that changes may be made in these exemplary embodiments without departing from the principles and spirit of the general inventive concept, the scope of which is defined in the claims and their equivalents.

What is claimed is:

1. A method comprising:
    arranging a disk of a hard disk drive on an upper end portion of a hub having a plurality of disks rotatably assembled thereto;
    assembling the disk on the hub by vibrating the hub;
    arranging a spacer on the upper end portion of the hub; and
    assembling the spacer on the hub by vibrating the hub.

2. The method of claim 1, wherein the operations of the arranging of the spacer, the assembling of the spacer, the arranging of the disk, and the assembling of the disk are sequentially repeated a plurality of times to sequentially stack the plurality of disks along the hub such that each of the plurality of disks contacts an upper surface of one of a plurality of spacers.

3. The method of claim 1, wherein a gap between an outer circumferential surface of the hub and an inner diameter of the disk has a width ranging from about 1 um to 10 um.

4. The method of claim 1, wherein the hub is a hub of a spindle motor of the hard disk drive and, in the assembling of the disk on the hub, the hub is vibrated via a vibration generation unit coupled to a base of the hard disk drive.

5. The method of claim 4, wherein the vibration generation unit generates a high frequency displacement in the hub.

6. The method of claim 5, wherein the vibration generation unit generates a high frequency displacement in an upward direction in the hub by a voltage that is externally applied and, in the assembling of the disk on the hub, the hub is vibrated by applying a high frequency displacement in an upward direction to the hub by increasing a voltage to a preset voltage during a preset first time so that the disk is relatively lowered with respect to the hub, and by applying a high frequency displacement in a downward direction by decreasing a voltage to a preset voltage during a second time that is longer than the preset first time so that the disk is relatively lowered downwardly with the hub.

7. The method of claim 5, wherein the vibration generation unit comprises a piezoelectric device.

8. The method of claim 1, wherein the hub is a hub of an offline servo track writer of an offline servo track write (OLSTW) process, and the offline servo track writer further comprises:
    a flange portion provided in a lower end of the hub and supporting a spacer disposed at the lowermost side; and
    a mounting portion provided by extending toward the opposite side to the hub with respect to the flange portion.

9. The method of claim 8, wherein the offline servo track writer further comprises a hub housing to support the mounting portion and, in the assembling of the disk on the hub, the hub is vibrated via a vibration generation unit coupled to the hub housing.

10. The method of claim 8, wherein, in the assembling of the disk on the hub, the hub is vibrated via a vibration generation unit coupled to the mounting portion.

11. The method of claim 1, wherein assembling the disk on the hub by vibrating the hub further comprises:
    generating a vibration in at least one of a vertical direction and a horizontal direction.

12. A method, comprising:
arranging a plurality of disks on a hub portion of a disk holder, wherein the hub portion extends from a first surface of a flange portion of the disk holder and the disk holder also has a mounting portion that extends from a second surface of the flange portion and in the opposite direction from the hub portion;
generating a vibration to vibrate the hub portion in at least one of a vertical direction and a horizontal direction to center each of the plurality of disks with respect to the flange portion.

13. The method of claim 12, wherein generating the vibration further comprises generating a vibration by a vibration generation unit coupled to the mounting portion.

14. The method of claim 12, further comprising:
rotating the disk holder about an axis by a disk rotation driving unit coupled to the mounting portion.

15. The method of claim 12, wherein arranging the plurality of disks comprises:
inserting the hub portion of the disk holder into a through-hole of each of the plurality of disks.

16. The method of claim 12, wherein arranging the plurality of disks includes inserting the hub portion of the disk holder through each of a plurality of ring-shaped spacers such that each of the plurality of ring-shaped spacers is disposed between two of the plurality of disks and separates the two of the plurality of disks by a predetermined distance from one another.

17. The method of claim 16, wherein generating the vibration couples the plurality of spacers to the plurality of ring-shaped spacers and generates a gap having a width between the hub and the plurality of disks ranging from 1 um to 10 um.

18. A method comprising:
arranging a spacer and a disk on a hub extending from a flange portion of a disk holder; and
generating a vibration by a vibration generation unit coupled to a base of the disk holder to vibrate the base in a vertical direction to induce a vibration of the hub.

19. The method of claim 18, wherein generating the vibration centers the spacer and the disk with respect to the flange portion of the disk holder.

20. The method of claim 18, wherein generating the vibration vibrates the base in the vertical direction and a horizontal direction.

* * * * *